US011308303B2

(12) United States Patent
Swope et al.

(10) Patent No.: US 11,308,303 B2
(45) Date of Patent: Apr. 19, 2022

(54) USING BARCODES TO DETERMINE ITEM DIMENSIONS

(71) Applicant: ZEBRA TECHNOLOGIES CORPORATION, Lincolnshire, IL (US)

(72) Inventors: Charles Burton Swope, Coral Springs, FL (US); Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 21 days.

(21) Appl. No.: 16/888,387

(22) Filed: May 29, 2020

(65) Prior Publication Data
US 2021/0374376 A1    Dec. 2, 2021

(51) Int. Cl.
G06K 7/10      (2006.01)
G06K 7/14      (2006.01)

(52) U.S. Cl.
CPC ....... G06K 7/1456 (2013.01); G06K 7/10722 (2013.01); G06K 7/1413 (2013.01); G06K 7/1417 (2013.01)

(58) Field of Classification Search
CPC ............. G06K 7/10732; G06K 7/1456; G06K 7/1417; G06K 7/10722; G06K 7/1413; G06Q 10/087; G06Q 30/0633; G06Q 30/0269; G06Q 10/0833; G06Q 30/0601
USPC ......... 235/462.01, 472.01, 462.25, 454, 375, 235/383, 494, 462.14
See application file for complete search history.

(56) References Cited

U.S. PATENT DOCUMENTS

2020/0143130 A1*  5/2020  Costello .............. H04N 13/271
2021/0158000 A1   5/2021  Fjellstad et al.

FOREIGN PATENT DOCUMENTS

EP      2482224 A2     8/2012

OTHER PUBLICATIONS

Combined Search and Examination Report for Great Britain Patent Application No. 2106757.4 dated Oct. 4, 2021.

* cited by examiner

Primary Examiner — Jamara A Franklin
(74) Attorney, Agent, or Firm — Yuri Astvatsaturov (57) ABSTRACT

Methods and systems for using barcodes to determine item dimensions are disclosed herein. An example method includes a scanner identifying a barcode in an image of an object, and determining a datum associated with the barcode. A physical feature of the object located outside of the barcode is identified. A comparison of the datum associated with the barcode to the physical feature is made; and, in response, at least one dimension of the object is determined.

30 Claims, 7 Drawing Sheets

USING BARCODES TO DETERMINE ITEM DIMENSIONS

BACKGROUND

Image-based scanners are often used to read barcodes at the point of sale (POS). In this regard, the image-based scanner may read a barcode to charge a customer a particular amount of money. However, thieves have developed a way to circumvent this by placing the barcode from one product on another product. This practice is sometimes referred to as "ticket switching."

Various anti-ticket switching and item verification applications can be accomplished by a convolutional neural network (CNN). For example, using a CNN, an object in an image taken at the POS may be classified and then compared to what the object "should" be based on information from a classification from a barcode on the object, thereby detecting if ticket switching has occurred. Yet, many CNN driven applications are not straightforward to implement. They require additional processing beyond a typical decode processor. This adds extra time and costs money. Plus, to properly train, CNNs require large set of images, typically in the 10,000+ range. The learning images are ideally selected from the best images that include only one object. These images can be large, which requires extra memory.

Additionally, if it is desired to establish a universal CNN to identify objects across all points of sale, then those images are sent to a central database in the cloud. The number of images that then are transferred over to the cloud strains a store's existing IT architecture. Also, there is additional time delay that could result from the processing taking place remotely in a cloud.

There is thus a need for improved techniques for detecting and preventing ticket switching.

SUMMARY

In an embodiment, the present invention is a method for determining object dimensions using a barcode reader. The method comprises identifying a barcode in an image of an object; determining a datum associated with the barcode; identifying a physical feature of the object located outside of the barcode; comparing the datum associated with the barcode to the physical feature and, in response, determining at least one dimension characteristic of the object; and in response to determining the at least one dimension characteristic, comparing the at least one dimension characteristic to at least one reference dimension characteristic of the object, and in response to a mismatch between the at least one dimension characteristic and the at least one reference dimension characteristic, determining an improper object detection event has occurred.

In a variation of this embodiment, determining the datum comprises determining a dimension of the barcode as the datum.

In a variation of this embodiment, the dimension of the barcode is a length of the barcode, a length of an element portion of the barcode, or a boundary dimension of the barcode.

In a variation of this embodiment, determining the datum comprises: identifying a boundary of the barcode in the image; determining, from the boundary, if the barcode in the image is in a geometrically aligned position; and in response to the boundary not being in a geometrically aligned position, performing a geometric transformation on the boundary and determining the datum from a geometrically transformed boundary.

In a variation of this embodiment, the geometric transformation is a geometric rotation of the boundary, a geometric translation of the boundary, a geometric resizing of the boundary, and/or geometric tilt rectification on the boundary.

In a variation of this embodiment, the method further includes determining, from the geometric transformation, a dimension of physical feature of the object located outside of the barcode.

In a variation of this embodiment, determining the datum comprises: determining a type of the barcode; and determining a dimension of the barcode from the type of barcode, the dimension being the datum associated with the barcode.

In a variation of this embodiment, the type of barcode is selected from the group consisting of 80% UPC, 100% UPC, a QR code, a 1D barcode, a 2D barcode, a Digimarc, and a 2D data matrix.

In a variation of this embodiment, the physical feature is an edge of the object, an edge of a label containing at least a portion of the barcode, or a graphic on the object.

In a variation of this embodiment, the datum is a dimension of the barcode, and comparing the datum to the physical feature comprises: determining a geometric distance between the datum and the physical feature.

In a variation of this embodiment, the graphic on the object is text on the object.

In a variation of this embodiment, the physical feature is a curvature of the object, and comparing the datum to the physical feature comprises: comparing a dimension of the barcode to the curvature of the object.

In a variation of this embodiment, determining the datum associated with the barcode comprises: determining a density of the barcode; and determining a dimension of the barcode from the barcode density.

In a variation of this embodiment, determining the datum associated with the barcode comprises: decoding a payload of the barcode; and determining a dimension of the barcode from the payload.

In a variation of this embodiment, the method further includes: in response to determining the improper object detection event has occurred, communicating an alarm signal.

In a variation of this embodiment, the method further includes, in response to determining the at least one dimension characteristic, determining if there is at least one reference dimension characteristic of the object to compare with the at least one dimension characteristic, and in response to determining that there is no at least one reference dimension characteristic to compare, storing the at least one dimension characteristic in a reference dimension characteristic model for the object.

In a variation of this embodiment, the method further includes, prior to the comparing the at least one dimension characteristic to at least one reference dimension characteristic of the object: identifying and decoding a payload of the barcode; identifying the at least one reference dimension characteristic from the decoded payload; and determining that the at least one dimension characteristic corresponds to the at least one reference dimension characteristic.

In a variation of this embodiment, the at least one dimension characteristic includes at least one of: an outer dimension of the object; a position of a label on the object; a position of text on the object; and an internal dimension of the object.

In a variation of this embodiment, the method further includes: recognizing a character in proximity to the barcode; determining a position of the character based on the datum; and using an optical character recognition (OCR) technique to at least one of: store the character and position in a reference model; and compare the character data to similarly positioned character data stored in a reference model.

In another embodiment, the present invention is a method improper object detection, and for developing a reference dimension model for an object. The method comprises: a) identifying a barcode in an image of an object; b) determining at least one datum associated with the barcode; c) identifying a plurality of physical features of the object, each physical feature located outside of the barcode; d) comparing the at least one datum associated with the barcode to the physical features and determining a plurality of dimension characteristics for the object; e) storing the plurality of dimension characteristics as the reference dimension model; and f) determining that an improper object detection event has occurred by: (i) comparing a dimension characteristic of the plurality of dimension characteristics to a dimension characteristic of a detected object, and (ii) determining a mismatch between the dimension characteristic of the plurality of dimensions characteristics and the dimension characteristic of the detected object.

In a variation of this embodiment, the at least one datum comprises a length of the barcode, a length of an element portion of the barcode, or a boundary dimension of the barcode.

In a variation of this embodiment, determining the at least one datum comprises: identifying a boundary of the barcode in the image; determining, from the boundary, if the barcode in the image is in a geometrically aligned position; and in response to the boundary not being in a geometrically aligned position, performing a geometric transformation on the boundary and determining the datum from a geometrically transformed boundary.

In a variation of this embodiment, the geometric transformation is a geometric rotation of the boundary, a geometric translation of the boundary, a geometric resizing of the boundary, and/or geometric tilt rectification on the boundary.

In a variation of this embodiment, the plurality of physical features are selected from the group consisting of an edge of the object, an edge of a label containing at least a portion of the barcode, and a graphic on the object.

In a variation of this embodiment, the method further includes performing a), b), and c) for a subsequent image of the object or of another object. In this variation, the method further includes: determining subsequent values for any of the plurality of dimensions; determining variation tolerances for any of the plurality of dimensions; and storing the variation tolerances in the reference dimension model.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various embodiments of the present disclosure, a method, and related systems and devices, are described for determining object dimensions using a barcode reader, and for developing a reference dimension model for an object.

As mentioned above, there is a need for improved systems to prevent illegal practices such as ticket switching. In this regard, there could be an image or video based system for detecting that a barcode has been changed from one product to another (e.g., ticket switched). However, this would likely require much data to be transmitted to a cloud to be processed. Some embodiments described herein address this problem by determining dimension data from a barcode; some embodiments then use the dimension data (rather than image or video data) to determine if ticket switching has occurred. This greatly cuts back on the amount of data that needs to be transmitted or processed.

Figure 1A:
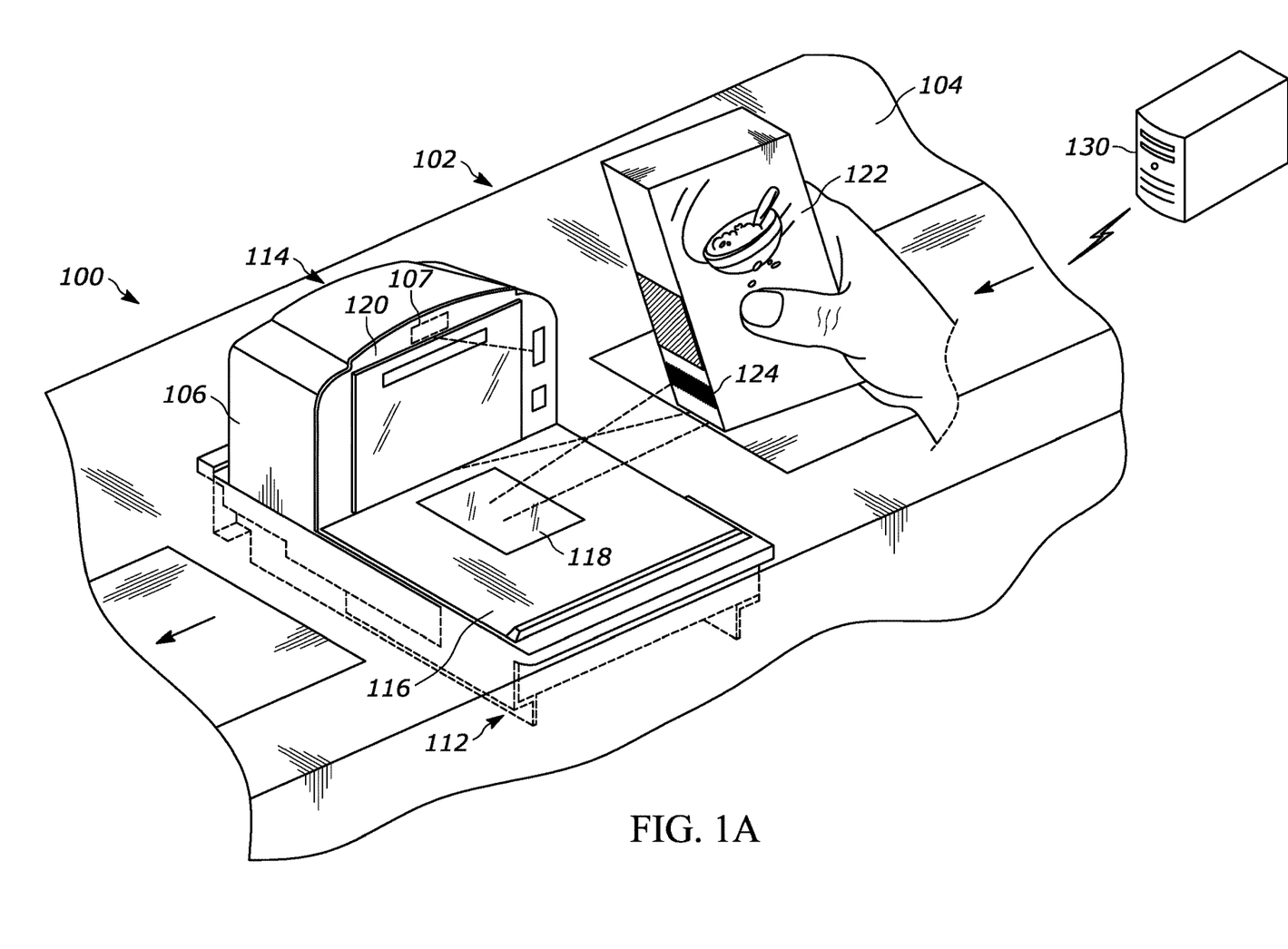
FIG. 1A illustrates an example of a bi-optic scanner for implementing example methods and/or operations described herein including techniques for determining object dimensions.

FIG. 1A illustrates a perspective view of an example imaging system capable of implementing operations of the example methods described herein, as may be represented by the flowcharts of the drawings that accompany this description. In the illustrated example, an imaging system 100 is in the form of a point-of-sale (POS) system, having a workstation 102 with a counter 104, a bi-optical (also referred to as "bi-optic") symbology reader 106 (that may be used in the object recognition systems and methods described herein), and an additional camera 107 at least partially positioned within a housing of the barcode reader 106. In examples herein, the symbology reader 106 is referred to as a barcode reader. Further, in examples herein, the camera 107 may be referred to as an image acquisition assembly and may be implemented as a color camera or other camera configured to obtain images of an object.

Imaging systems herein may include any number of imagers housed in any number of different devices. While FIG. 1A illustrates an example bi-optic barcode reader 106 as the imager, in other examples, the imager may be a handheld device, such as a handheld barcode reader, or a fixed imager, such as barcode reader held in place in a base and operated within what is termed a "presentation mode."

In the illustrated example, the barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some examples, the top portion 116 may include a removable or a non-removable platter (e.g., a weighing platter).

In the illustrated example of FIG. 1A, the barcode reader 106 captures images of an object, in particular a product 122, such as for example a box. In some implementations, the barcode reader 106 captures these images of the product 122 through one of the first and second optically transmissive windows 118, 120. For example, image capture may be done by positioning the product 122 within the fields of view FOV of the digital imaging sensor(s) housed inside the barcode reader 106. The barcode reader 106 captures images through these windows 118, 120 such that a barcode 124 associated with the product 122 is digitally read through at least one of the first and second optically transmissive windows 118, 120.

In the illustrated example of FIG. 1A, additionally, the barcode reader 106 captures images of the product 122 using the camera 107, which captures images and generates image data that can be processed to verify that the product 122 scanned matches the barcode 124 and/or image data can be used to populate a database.

To implement operations of the example object detection techniques herein, images captured through any of the windows 118, 120 or the camera 107 may be used for identifying the product 122, such as through determining a first object identification data using image captured of the product 122 and determining a second object identification data using the barcode 124, and comparing the two identification data.

In the illustrated example of FIG. 1A, the imaging system 100 includes a remote server 130 communicatively coupled to the barcode reader 106 through a wired or wireless communication link. In some examples, the remote server 130 is communicatively coupled to a plurality of imaging systems 100 positioned at checkout area of a facility, for example. In some examples, the remote server 130 is implemented as an inventory management server that generates and compares object identification data. In some examples, the remote server 130 is accessible by a manager for monitoring operation and improper product scanning by the imaging system 100.

Figure 1B:
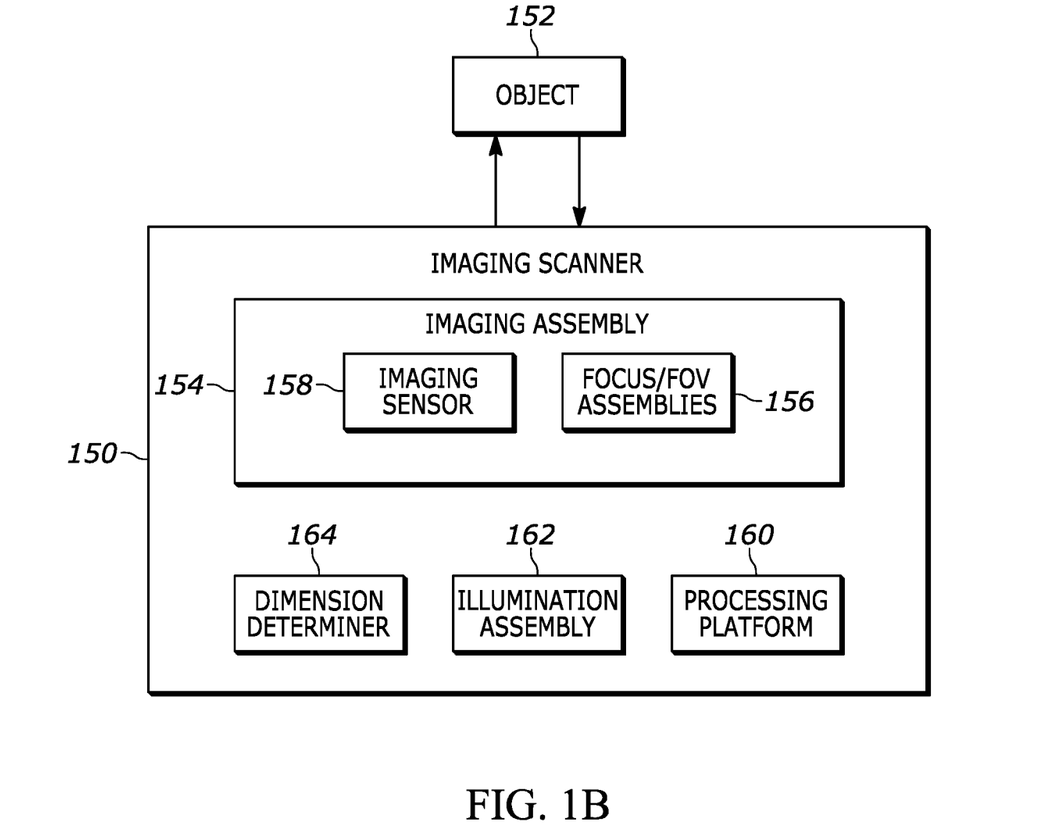
FIG. 1B is a block diagram of an example imaging reader for implementing example methods and/or operations described herein including techniques for determining object dimensions using a barcode reader.

FIG. 1B is an illustration of an example imaging scanner 150 capable of implementing operations of the example methods described herein, as may be represented by the flowcharts of the drawings that accompany this description.

As discussed in various examples, the imaging scanner 150 may be a barcode reader, such as a handheld barcode reader or mountable barcode reader, capable of reading a barcode on an object in the field of view of the barcode reader.

In some examples, the imaging scanner 150 may be a barcode reader formed as an imager, such as bi-optic imager having a vertical extending platter and horizontal extending tower, each capable of capturing an image of an object over a field of view, and each capable of identifying and reading a barcode on the object. As used herein, reference to barcode includes any indicia that contains decodable information and that may be presented on or within a target, including by not limited to, a one dimension (1D) barcode, a two dimension (2D) barcode, a three dimension (3D) barcode, a four dimension (4D) barcode, a QR code, a direct part marking (DPM), etc.

In the illustrated example, the imaging scanner 150 includes an imaging assembly 154 configured to capture an image of a target. To focus on objects of interest, the example imaging assembly 154 includes any number and/or type(s) of focus/field-of-view assemblies (focus/FOV assemblies) 156 that collect reflected light from an object 152 and impinge that light onto an imaging sensor 158. These focus/FOV assemblies 156 may be formed of a different fields of views, each collecting a different field of view of a space. These focus/FOV assemblies 156 may be characterized by one or more focal distances and one or more focal plane positions of the imaging sensor 158. In various examples, one or more of these physical features of the focus/FOV assemblies may be controllable by processing platform 160 (e.g., a logic circuit). The illustrated example also includes dimension determiner 164 for determining dimensions of a product. The dimension determiner 164 may, for example, perform the operations of FIGS. 6 and 7, determine an improper scan attempt, determine a reference dimension characteristic (e.g., an outer dimension of the object; a position of a label on the object; a position of text on the object; an internal dimension of the object; etc.), store a reference dimension model, and so forth.

In a barcode reader implementation of the imaging scanner 150, for example, these focus/FOV assemblies 156 may include a variable focusing element, either an optically controllable variable focusing element or a digitally controllable variable focusing element. A barcode reader may include other systems having physical features that may be configured by the processing platform 160. For example, a barcode reader implementation may further include an aiming assembly configured to generate an aiming pattern, e.g., dot, crosshairs, line, rectangle, circle, etc., that impinges on the target.

The imaging scanner 150 further includes an illumination assembly 162 configured to illuminate a target over one or more fields of view the imaging scanner 150.

In a barcode reader implementation, for example, the illumination assembly 162 may generate a monochromatic illumination over a field of view, while in other examples, the illumination assembly 162 generates a poly-chromatic illumination, such a white light illumination, over the field of view. In various examples, the illumination assembly 162 contains a plurality of different illumination sources, such as illumination sources that generate illumination at different output wavelengths. In some examples, these illumination sources differ in type, such that the illumination assembly 162 may include light emitting diodes (LEDs), visible light sources, and/or infrared light sources. Which illumination source is being used at a given time may be determined by the processing platform 160.

In these ways, the illumination assembly 162 includes numerous configurable settings, including the selected illumination source, the illumination wavelength or wavelength range, the type of illumination source, and the illumination brightness. These features may be configured by instruction from the processing platform 160. Additionally, optical features of the imaging sensor 158 may be configured, such as optical gain and exposure time, where optical gain refers to controlling optical gain elements in the path of the received light. In other examples, digital gain, for example, as applied in the readout integrated circuit of the imaging sensor 158, may be configured.

Further, in some examples, the illumination assembly 162 may have one or more fields of view for different illumination sources, such as, a bi-optic imager having a horizontal tower illumination assembly for producing an illumination beam extending vertically into a first field of view and a vertical platter illumination assembly for producing an illumination beam extending horizontally into a second field of view, where these two fields of view can overlap. The field of view currently used by the illumination assembly 162 may be selected and, in some examples, adjusted, through configuration settings.

Various anti-theft and item verification applications can be accomplished by intense data processing in a cloud-based environment, and one example of this involves training and using a convolutional neural network (CNN) to identify objects by performing classifications on captured images. Conventional CNN techniques often require considerable processing, which adds time and costs for proper deployment. CNNs typically require a large set of learning images and ideally images selected from the best images that include only one object. These images can be large, which requires extra memory.

Additionally, if it is desired to establish a universal network to identify objects across all points of sale, then those images are sent to a central database in the cloud. The number of images that then are transferred over to the cloud strains a store's existing IT architecture. Also, there is additional time delay that could result from the processing taking place remotely in a cloud.

While the particular features herein may be advantageous in avoiding CNN (and thus avoiding the additional required processing and cost), these processes herein may nonetheless be implemented in coordination with a CNN and/or using a remote server. Thus, implementations with processes executed at the barcode reader are provided by way of example and not limitation. For example, some embodiments use a LAN that manages the systems and methods described herein for a small number of POS in a system.

It contrast to conventional, standalone CNN systems, the present techniques allow for performing similarly robust anti-theft monitoring by using reference models that may be stored and executed at the barcode reader device and that may be generated without CNN training or other machine learning classification processes. Indeed, while the present techniques may be integrated with an existing CNN system, by generating and referencing reference models, the present techniques can more quickly assess an object in a captured image, search of visual features in the image, and assessment, based on the reference models, whether the object scanned was an improper scan or a proper scan. In some examples, as further discussed, these reference models may include a number of different visual features and use dimensions of each to validate the scanning of an object. Visual features dimensions can use much less data, allowing them to be stored locally within a barcode reader, or they can be transmitted to a cloud for image processing and/or object identification, with less resources than a CNN standalone system. In this regard, some embodiments described herein advantageously first determine dimensions of an item, and then use the dimensions to determine if an improper scan attempt has occurred.

The barcode reader uses image of the barcode to identify each item being scanned. In some embodiments, the barcode is a constant in each decoded image that can be leveraged to help determine item dimensions. A barcode may be relied upon for use as a datum and measurement unit for which to determine the item dimensions with respect to the barcode. The ratio of these measurements can then be stored to be compared against in the future.

In some embodiments, vectors are used to identify directions and distances of visual features. As used herein, a "visual feature" may be a physical feature and/or a printed feature. Examples of physical features include: a length to a part of an item, a length of a part of an item, a shape of a part of the item, any physical marking on the item, or any physical characteristic of the item. Examples of printed features include alpha or numeric characters or text, graphics, and images. Indeed, references to processes herein being implemented on a "visual feature," a "physical feature," or a "printed feature" are intended to be representative. Those same processes may be performed with respect to any of the other features, whether explicitly mentioned in the example or not. Further references to any of one of these features is intended to encompass multiple features of the referenced feature or any of feature.

In some embodiments, a vector stores information identifying visual features. By using vectors to define some or all visual features, an image can be analyzed and vectors can be used to spot visual features and/or determine if the visual features are in directions and distances that are expected.

Furthermore, directional data from the vectors may be used to look at a specific location on the item. Moreover, features associated with other aspects may be searched for using vector data; for example, physical features associated with an edge of an item, or printed features associated with a surface may be searched for.

Figure 2:
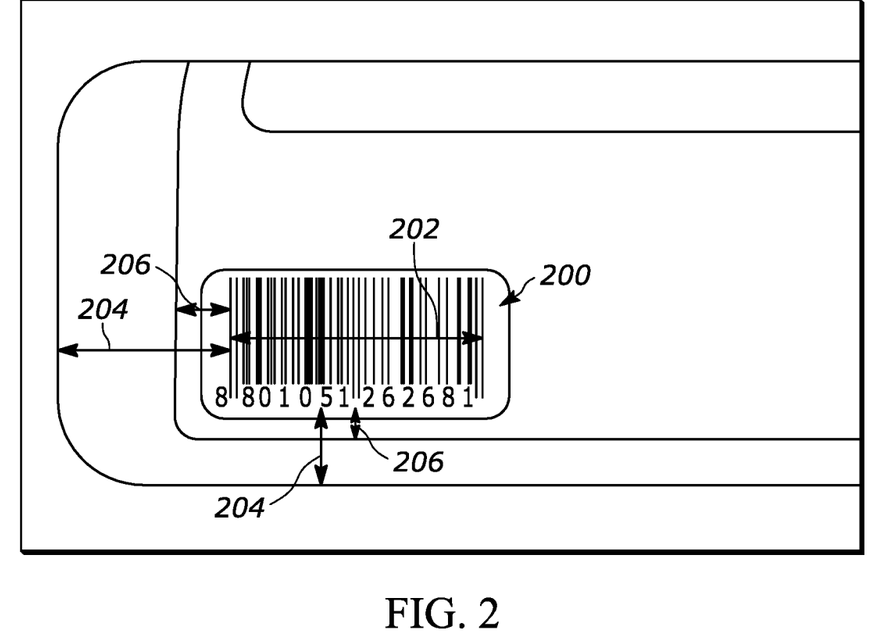
FIG. 2 illustrates an example barcode on an example image, and further illustrates examples of dimensions that may be used as datum.

In the example of FIG. 2, the length 202 of the barcode 200 is measured (e.g., as determined by dimension determiner 164), so the distances to the edges of the product 204 can be easily determined, as can distances to the edges of a product label 206. These distances can then be compared against the known distances of the item in question to determine if they match the expected item being scanned. This can be used to flag cases where fraudulent behavior, such as ticket switching, is attempted, and alert the cashier or the store's security. A barcode scanning system can build a database of the dimensions of items as scanning occurs, or could have a database of known item dimensions uploaded to it, for use in comparisons.

In the example of FIG. 2, the barcode 200 is well aligned to the imaging field of view of focus/FOV assemblies 156. However, with rapid scanning at the POS, this is not always possible or even likely. It is more likely that the object will be tilted or rotated with respect to the imaging FOV of focus/FOV assemblies 156. In those cases, the extents of the barcode boundaries can be located and the boundary dimensions determined by dimension determiner 164 to aid in the determination of both rotation and translation.

Figure 3A:
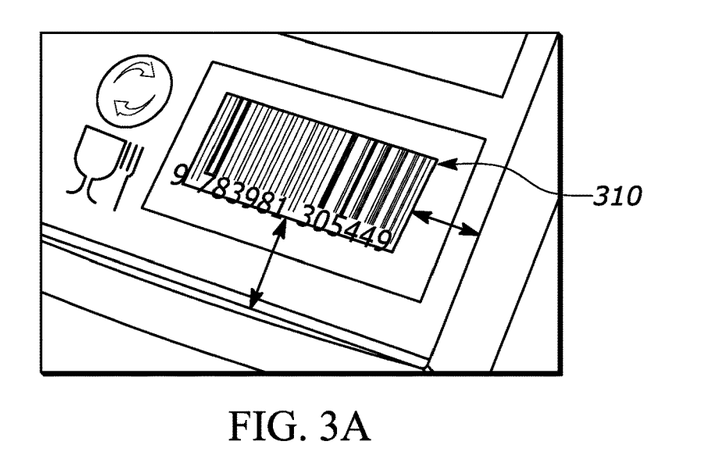
FIG. 3A illustrates an example of a rotated barcode.

In the rotational example of FIG. 3A, the boundaries of the barcode 310 are located and a rotation angle is determined. Subsequently, dimensions can be found by dimension determiner 164 based on the known rotation.

Figure 3B:
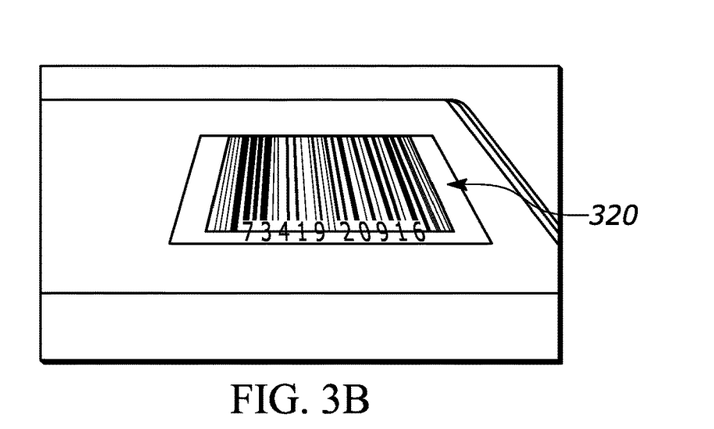
FIGS. 3B and 3C illustrate examples of tilted barcodes.
Figure 3C:
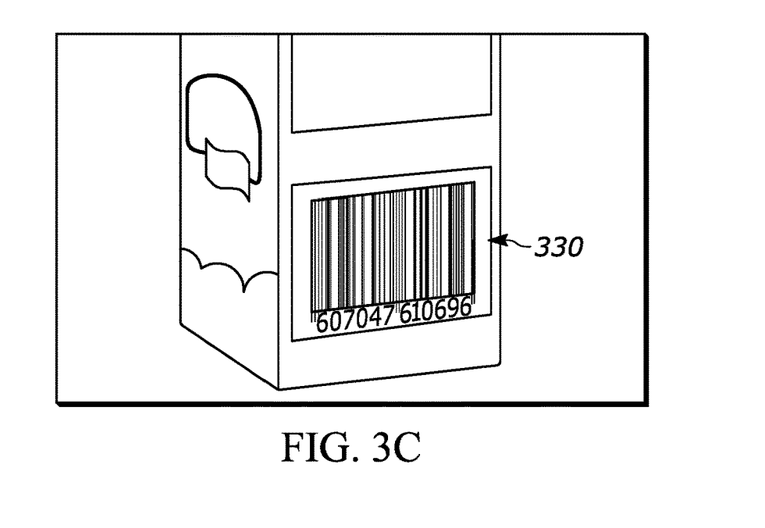

Given the quadrangular boundaries of a tilted barcode (see, e.g., barcode 320 of FIG. 3B, or barcode 330 of FIG. 3C), the barcode might be rectified to a normal rectangle to compensate for perspective. Once the barcode boundaries have been rectified, then subsequent dimensions might be rectified using the same factors (e.g., by dimension determiner 164).

The decoded data can also differentiate, for example, left from right to determine code orientation, which helps to determine which sides of the code boundaries the dimensions are associated with.

Optical character recognition (OCR) may also be used to look for consistently similar characters nearby the barcode. This can help identify when a barcode has been removed from one package and placed onto another one of similar size (e.g., ticket switching between similar size packages).

Some embodiments further leverage OCR to aid in the detection of an improper scan attempt. In this regard, some embodiments recognize a numeric or alphabetic character(s) in proximity to the barcode or anywhere on the object 152, and then determine a position of the character(s) based on the datum. An OCR technique may then be used, for example, to (i) store the character(s) and position in a reference model, or (ii) compare the character(s) to similarly positioned character(s) of a reference model. As should be understood, whether the character(s) is in proximity to the barcode may be dependent on the size of the object 152.

Figure 4A:
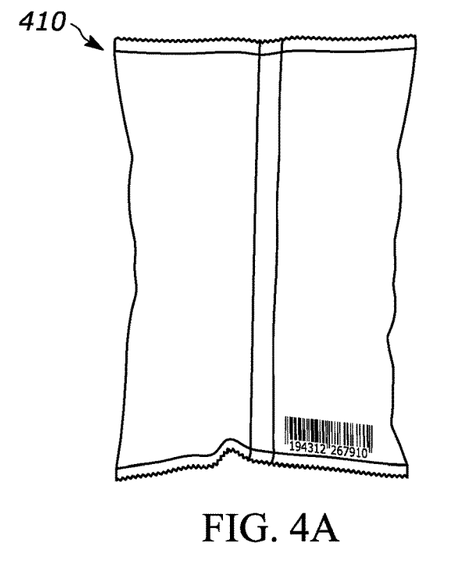
FIG. 4A illustrates an example of an object with a shape that deforms a barcode on the object.

Certain packages might have some variation in the distances. Some examples of this include bags that deform in shape (e.g., the bag 410 of FIG. 4A), or packages where the barcode is not consistently placed. In such cases, the dimension determiner 164 can learn what the typical tolerances are for the dimensions to the package or label edges and can flag cases that exceed the given tolerance (e.g., detect an improper scan attempt when a tolerance is exceeded).

Figure 4B:
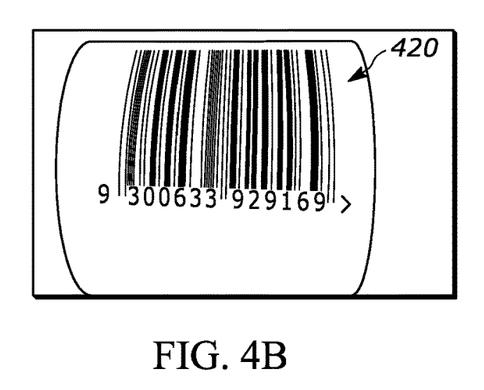
FIG. 4B shows an example of a barcode on a cylindrical object.

Additionally, the curvature can be determined for barcodes placed on cylindrical objects to determine it has not been moved to a surface with a different curvature. In this regard, FIG. 4B shows an example of a barcode 420 placed on a cylindrical object. Furthermore, in the case of curved objects, the barcode measurement parallel to the axis of rotation may be used to determine the diameter of a curved object with respect to the barcode size.

In some aspects, the density of the barcode is immaterial to any calculations, because each item's specific barcode may be used as a both datum and unit of measurement for the dimensions of the item in question. Thus, it does not matter if the barcode is 80% UPC or 100% UPC—the dimension determiner 164 would still be able to determine dimensions relative to each code.

Alternatively or additionally, some embodiments are pre-programmed with the given item's barcode density. These embodiments (because the barcode density is known) may use the dimensions of the barcode as a definitive measurement method to find the true dimensions of the item. Conversely, if the dimensions of the item were known to the system, the barcode density could be similarly inferred. Such data would be extremely useful to other item identification systems that might use the data harvested by a scanner using the techniques described in this disclosure. In some embodiments, the information itself (e.g., of the barcode density, item dimensions, or so forth) is gathered by the barcode reader by looking up the information in the data base (e.g., by using an identifier found in the payload of the barcode). In other embodiments, the information is coded into the barcode itself (e.g., read directly from the payload).

Figure 5:
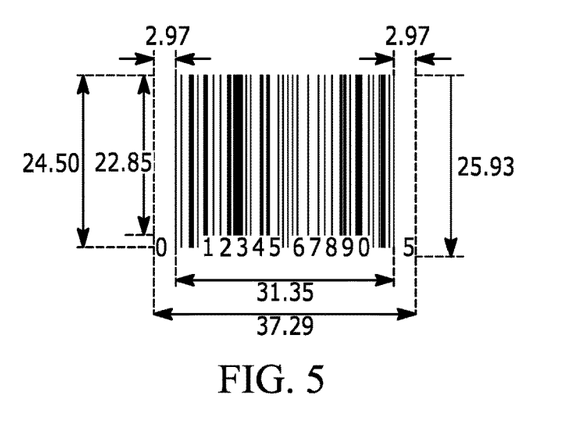
FIG. 5 shows an example of measurements from an example barcode.

Moreover, different dimensions of the barcode may be determined and used as datum. For example, FIG. 5 shows an example of dimensions from an example barcode. These illustrated dimensions may be used as datum.

Figure 6:
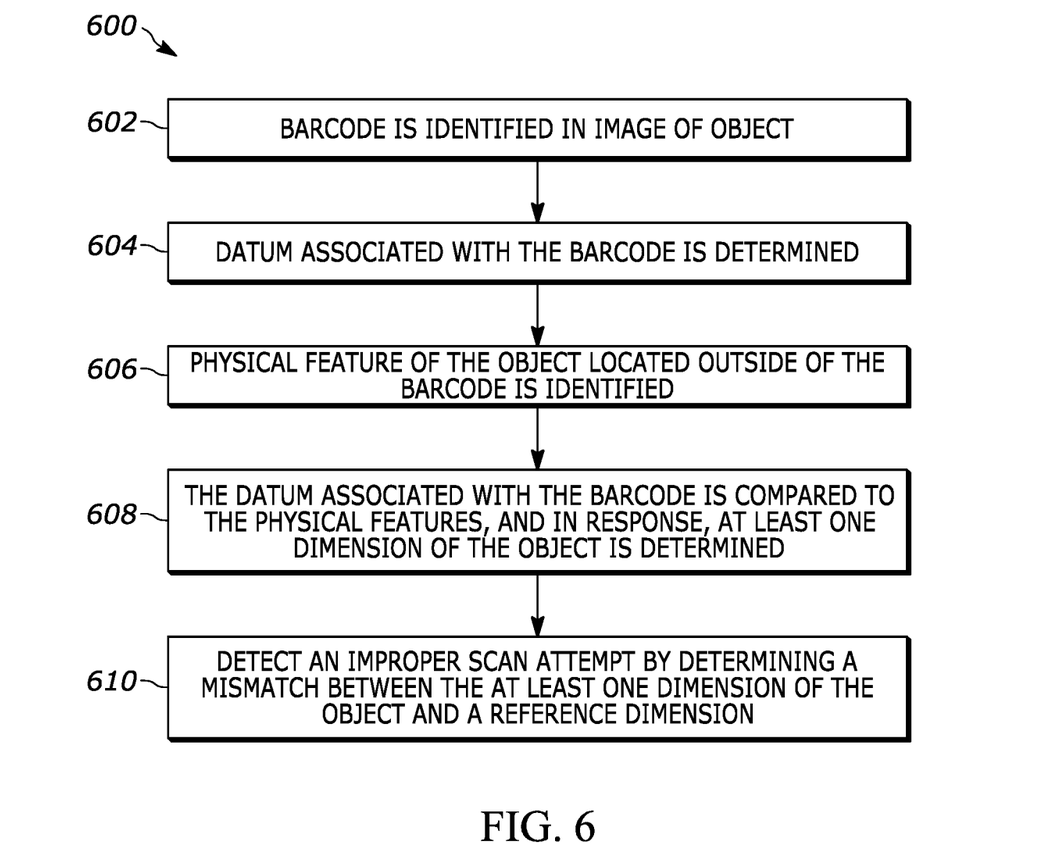
FIG. 6 illustrates a block diagram of an example process as may be implemented by the system of FIG. 1B, for implementing example methods and/or operations described herein including techniques for determining dimension(s) of an object.

FIG. 6 shows an example process 600, which, in some embodiments, is performed by dimension determiner 164. At process 602, a barcode is identified (e.g., by processing platform 160 of imaging scanner 150) on an object.

At process 604, a datum associated with the barcode is determined. In some embodiments, the determination of the datum is achieved by the imaging sensor 158 receiving an image; the processing platform 160 then identifying a barcode in the image; and the dimension determiner 164 then determining the datum from the barcode, as will be described further below. It should be noted that, in some embodiments, the datum is a dimension of the barcode (e.g., a length of the barcode; a length of an element portion of the barcode; a boundary dimension of the barcode; a distance from a first or last barcode line to an edge of a product or a product label; or so forth).

In some approaches, the determination of the datum may include identifying a boundary of the barcode in the image (e.g., with the processing platform 160). Then, the boundary may be used to determine if the barcode in the image is in a geometrically aligned position, and in response to the boundary not being in a geometrically aligned position, geometric transformation on the boundary may be performed. Subsequently, the datum may be determined from the geometrically transformed boundary. In one example, the geometric transformation is a geometric rotation of the boundary, a geometric translation of the boundary, a geometric resizing of the boundary, and/or geometric tilt rectification on the boundary.

In other example approaches, the determination of the datum includes determining a type of the barcode, and determining a dimension of the barcode from the type of barcode (the dimension being, e.g., the datum associated with the barcode). In some embodiments, the type of barcode may be a 80% UPC, a 100% UPC, a QR code, a 1D barcode, a 2D barcode, or a 2D data matrix.

In some embodiments, the datum determination is done by first determining a density of the barcode, and then determining a dimension of the barcode from the barcode density. In other embodiments, the datum determination is done by first decoding a payload of the barcode, and then determining a dimension of the barcode from the payload.

At process 606, a physical feature of the object 152 located outside of the barcode is determined. The physical feature may be, for example, an edge of the object 152, an edge of a label containing at least a portion of the barcode, or a graphic (e.g., text) on the object 152. The physical feature may be determined in various ways. For example, the physical feature may be determined by the processing platform 160 analyzing an image of object 152 received from imaging sensor 158. The processing platform 160 may store a plurality of different possible physical features that the processing platform will look for in captured images. The physical features may be stored in a memory of the imaging scanner 150. In some examples, the physical features are stored separately. In some examples, the physical features are stored in a reference model containing a plurality of reference dimension characteristics. In some examples, the physical features may be dependent on detected features in the captured image. For example, the processing platform 160 may be determined by identifying that an outer edge of an object has been captured in an image, or a label has been captured, or an edge of a label has been captured, or that a graphic on the object has been capture, or that text on the object has been captured. The processing platform may determine that such captured features on physical features. In some examples, the processing platform 160 further identifies a physical feature, in response to identifying one of these items. For example, the processing platform 160 may identify a plurality of outer edges of an object and determine an outer edge nearest an edge of the barcode as the physical feature. The identified edges may be outer edges but also edges or any boundaries of features within the outer periphery of the object, such as edges on internal features captured in an image. In another example, the processing platform 160 may use an OCR technique to determine a graphic (e.g., text) on the object as the physical feature. In some examples, the physical feature may represent multiple features, such as multiple edges captured in an image, or an edge of the location of OCR'd text or a graphic on the object.

In another example, the physical feature may be an alphabetic or numeric character(s) in proximity to the barcode or anywhere in the object 152. As should be understood, whether the character(s) is in proximity to the barcode may be dependent on the size of the object 152.

At process 608, the datum associated with the barcode is compared to the physical feature(s), and in response, at least one dimension of the object is determined. The comparison may be done by determining a geometric distance between the datum and the physical feature. In some embodiments, the physical feature is a curvature of the object, and the comparison is done by comparing a dimension of the barcode to the curvature of the object.

At process 610 an improper object scan detection is performed, e.g., detecting an improper object scan attempt (e.g., a theft attempt by ticket switching). At the block 610, for example, the dimension determiner 164 may determine a difference between a dimension characteristic (e.g., an outer dimension of the object; a position of a label on the object; a position of text on the object; an internal dimension of the object; etc.) determined from the image of the object and a reference dimension characteristic stored, e.g., by dimension determiner 164. In response to this finding, an alarm (e.g., audio, visual or silent) may be generated, and security personal within the store, or local law enforcement may be notified.

The reference dimension characteristic may be determined in various way. For example, the reference dimension characteristic may be determined the first time an item is scanned (e.g. the first time an item is scanned, the dimension determiner 164 stores the position of text on an object as the reference dimension); however, as is apparent, this approach works when ticket switching did not occur on the first item being scanned. In another example, the reference dimension characteristic is determined based on the reference dimension characteristic being found in a predetermined number of scans from the imaging sensor 158. In another example, a reference model may also store reference dimensions/characteristics, as described below with respect to FIG. 7.

In this regard, it is useful to build a "reference" model of an object. For example, the dimensions (or dimension characteristics) from a reference model may be compared to dimension data of an object to determine if ticket switching has occurred. Thus, in some aspects, a reference model may be used in place of training a CNN.

Figure 7:
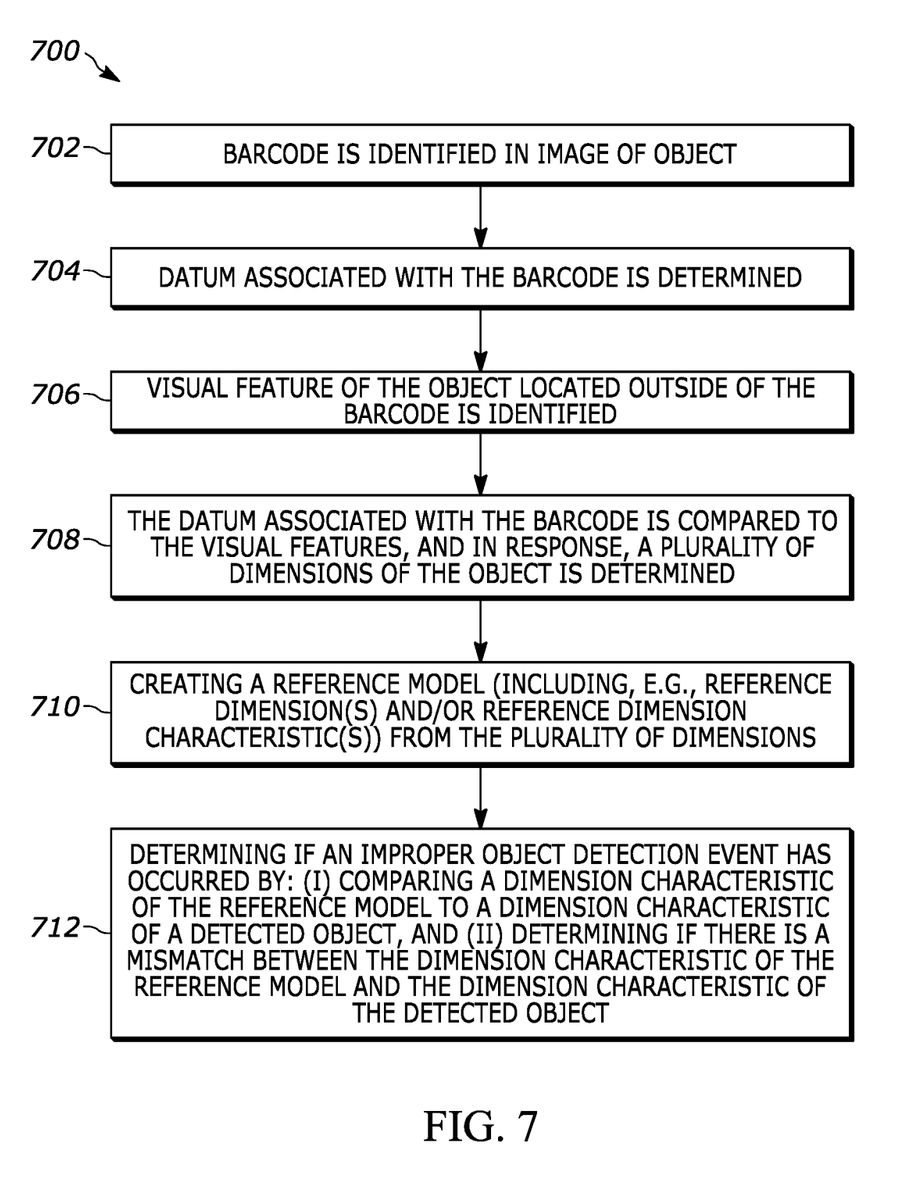
FIG. 7 illustrates a block diagram of an example process of building a reference dimension model that may be used in detecting an improper object scan with the system of FIG. 1.

FIG. 7 shows an example process 700 of building a reference model, which, in some embodiments, is performed by dimension determiner 164. At process 702, a barcode is identified (e.g., by imaging scanner 150) on an object. At process 704, a datum associated with the barcode is determined. In some embodiments, the datum is a dimension of the barcode (e.g., a length of the barcode; a length of an element portion of the barcode; a boundary dimension of the barcode; a distance from a first or last barcode line to an edge of a product or a product label; or so forth). In some approaches, the determination of the datum may include first identifying a boundary of the barcode in the image. Then, the boundary may be used to determine if the barcode in the image is in a geometrically aligned position, and in response to the boundary not being in a geometrically aligned position, geometric transformation on the boundary may be performed. Subsequently, the datum may be determined from the geometrically transformed boundary. In one example, the geometric transformation is a geometric rotation of the boundary, a geometric translation of the boundary, a geometric resizing of the boundary, and/or geometric tilt rectification on the boundary.

In other example approaches, the determination of the datum includes determining a type of the barcode, and determining a dimension of the barcode from the type of barcode (the dimension being, e.g., the datum associated with the barcode). In some embodiments, the type of barcode may be a 80% UPC, a 100% UPC, a QR code, a 1D barcode, a 2D barcode, or a 2D data matrix.

In some embodiments, the datum determination is done by first determining a density of the barcode, and then determining a dimension of the barcode from the barcode density. In other embodiments, the datum determination is done by first decoding a payload of the barcode, and then determining a dimension of the barcode from the payload. In some embodiments, if the barcode is only partially visible (e.g., a person's finger is covering part of the barcode), the dimension determiner 164 will attempt to determine what information it can from the portion of the barcode that is viewable; in that way, if density or other information is learned, the dimension determiner 164 may still be able to determine the dimensions of the object.

At process 706, a physical feature of the object located outside of the barcode is determined. The physical feature may be, for example, an edge of the object, an edge of a label containing at least a portion of the barcode, or a graphic (e.g., text) on the object.

At process 708, the datum associated with the barcode is compared to the physical feature(s), and in response, a plurality of dimensions of the object is determined. The comparison may be done by determining a geometric distance between the datum and the physical feature. In some embodiments, the physical feature is a curvature of the object, and the comparison is done by comparing a dimension of the barcode to the curvature of the object.

At process 710, a reference model is created from the plurality of dimensions. Furthermore, to improve upon the reference model, processes 702, 704 and 706 may be repeated for a subsequent image(s); and the reference model may be updated accordingly. Additionally, variation tolerances for any of the dimensions may be determined and stored. In some embodiments, these variation tolerances are useful in determining if an improper scan attempt has occurred, as discussed below. Furthermore, the reference model may include reference dimensions and/or reference dimension characteristics (e.g., an outer dimension of the object; a position of a label on the object; a position of text on the object; an internal dimension of the object; etc.). The reference dimensions and/or reference dimension characteristics may be determined in any way. For example, they may be determined by the dimension determiner 164 simply using the reference model (e.g., the dimension determiner 164 looks at the reference model and determines a position of a label and makes the position of the label the reference characteristic.

At process 712 an improper scan attempt (e.g., a theft attempt by ticket switching) may be found by determining a difference between a dimension determined from the image of the object and a dimension of the reference model. In response to this finding, an alarm (e.g., audio, visual or silent) may be generated, and security personal within the store, or local law enforcement may be notified. In some embodiments, if a dimension determined from an image of the object is outside of the variation tolerance, an improper scan attempt is found. In some embodiments, the improper scan event is determined by: (i) comparing a dimension characteristic of the reference model to a dimension characteristic of a detected object, and (ii) determining if there is a mismatch between the dimension characteristic of the reference model and the dimension characteristic of the detected object.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for improper object detection using a barcode reader, the method comprising:
   identifying a barcode in an image of an object;
   determining a datum associated with the barcode;
   identifying a visual feature of the object located outside of the barcode;
   comparing the datum associated with the barcode to the visual feature and, in response, determining at least one dimension characteristic of the object; and
   in response to determining the at least one dimension characteristic, comparing the at least one dimension characteristic to at least one reference dimension characteristic of the object, and in response to a mismatch between the at least one dimension characteristic and the at least one reference dimension characteristic, determining an improper object detection event has occurred;
   wherein the visual feature comprises one or more of a physical feature or a printed feature.

2. The method of claim 1, wherein determining the datum comprises:
   determining a dimension of the barcode as the datum.

3. The method of claim 2, wherein the dimension of the barcode is a length of the barcode, a length of an element portion of the barcode, or a boundary dimension of the barcode.

4. The method of claim 2, wherein determining the datum comprises:
   identifying a boundary of the barcode in the image;
   determining, from the boundary, if the barcode in the image is in a geometrically aligned position; and
   in response to the boundary not being in a geometrically aligned position, performing a geometric transformation on the boundary and determining the datum from a geometrically transformed boundary.

5. The method of claim 4, wherein the geometric transformation is a geometric rotation of the boundary, a geometric translation of the boundary, a geometric resizing of the boundary, and/or geometric tilt rectification on the boundary.

6. The method of claim 4, further comprising determining, from the geometric transformation, a dimension of visual feature of the object located outside of the barcode.

7. The method of claim 1, wherein determining the datum comprises:
   determining a type of the barcode; and
   determining a dimension of the barcode from the type of barcode, the dimension being the datum associated with the barcode.

8. The method of claim 7, wherein the type of barcode is selected from the group consisting of 80% UPC, 100% UPC, a QR code, a 1D barcode, a 2D barcode, a Digimarc, and a 2D data matrix.

9. The method of claim 1, wherein the visual feature is an edge of the object, an edge of a label containing at least a portion of the barcode, or a graphic on the object.

10. The method of claim 9, wherein the datum is a dimension of the barcode, and wherein comparing the datum to the visual feature comprises:
    determining a geometric distance between the datum and the visual feature.

11. The method of claim 9, wherein the graphic on the object is text on the object.

12. The method of claim 1, wherein the visual feature is a curvature of the object, and wherein comparing the datum to the visual feature comprises: comparing a dimension of the barcode to the curvature of the object.

13. The method of claim 1, wherein determining the datum associated with the barcode comprises:
    determining a density of the barcode; and
    determining a dimension of the barcode from the barcode density.

14. The method of claim 1, wherein determining the datum associated with the barcode comprises:
    decoding a payload of the barcode; and
    determining a dimension of the barcode from the payload.

15. The method of claim 1, further comprising:
    in response to determining the improper object detection event has occurred, communicating an alarm signal.

16. The method of claim 1, further comprising:
    in response to determining the at least one dimension characteristic, determining if there is at least one reference dimension characteristic of the object to compare with the at least one dimension characteristic, and in response to determining that there is not at least one reference dimension characteristic to compare, storing the at least one dimension characteristic in a reference dimension characteristic model for the object.

17. The method of claim 1, further comprising, prior to the comparing the at least one dimension characteristic to at least one reference dimension characteristic of the object:
  identifying and decoding a payload of the barcode;
  identifying the at least one reference dimension characteristic from the decoded payload; and
  determining that the at least one dimension characteristic corresponds to the at least one reference dimension characteristic.

18. The method of claim 1, wherein the at least one dimension characteristic includes at least one of:
  an outer dimension of the object;
  a position of a label on the object;
  a position of text on the object; and
  an internal dimension of the object.

19. The method of claim 1, further comprising:
  recognizing a character in proximity to the barcode;
  determining a position of the character based on the datum; and
  using an optical character recognition (OCR) technique to at least one of:
  store the character and position in a reference model; and
  compare the character data to similarly positioned character data stored in a reference model.

20. The method of claim 1, wherein the at least one reference dimension characteristic is part of a reference model, and wherein the method further comprises:
  checking the reference model for a visual feature of the reference model;
  examining the image of the object for the visual feature, and not finding the visual feature of the reference model in the examined image; and
  in response to not finding the visual feature of the reference model in the examined image, generating an alarm.

21. The method of claim 1, wherein each of the steps are performed by a barcode reader.

22. A method for improper object detection, and developing a reference dimension model for an object, the method comprising:
  a) identifying a barcode in an image of an object;
  b) determining at least one datum associated with the barcode;
  c) identifying a plurality of visual features of the object, each visual feature located outside of the barcode, wherein the plurality of visual features comprises physical features or printed features;
  d) comparing the at least one datum associated with the barcode to the visual features and determining a plurality of dimension characteristics for the object;
  e) storing the plurality of dimension characteristics as the reference dimension model; and
  f) determining that an improper object detection event has occurred by: (i) comparing a dimension characteristic of the plurality of dimension characteristics to a dimension characteristic of a detected object, and (ii) determining a mismatch between the dimension characteristic of the plurality of dimensions characteristics and the dimension characteristic of the detected object.

23. The method of claim 22, wherein the at least one datum comprises a length of the barcode, a length of an element portion of the barcode, or a boundary dimension of the barcode.

24. The method of claim 22, wherein determining the at least one datum comprises:
  identifying a boundary of the barcode in the image;
  determining, from the boundary, if the barcode in the image is in a geometrically aligned position; and
  in response to the boundary not being in a geometrically aligned position, performing a geometric transformation on the boundary and determining the datum from a geometrically transformed boundary.

25. The method of claim 24, wherein the geometric transformation is a geometric rotation of the boundary, a geometric translation of the boundary, a geometric resizing of the boundary, and/or geometric tilt rectification on the boundary.

26. The method of claim 24, wherein the plurality of visual features are selected from the group consisting of an edge of the object, an edge of a label containing at least a portion of the barcode, and a graphic on the object.

27. The method of claim 24, further comprising performing a), b), and c) for a subsequent image of the object or of another object, the method further comprising:
  determining subsequent values for any of the plurality of dimensions;
  determining variation tolerances for any of the plurality of dimensions; and
  storing the variation tolerances in the reference dimension model.

28. The method of claim 22, wherein the steps are performed by a barcode reader.

29. An electronic device for improper object detection using a barcode reader, electronic device comprising a housing including a controller, wherein the controller is configured to:
  identify a barcode in an image of an object;
  determine a datum associated with the barcode;
  identify a visual feature of the object located outside of the barcode;
  compare the datum associated with the barcode to the visual feature and, in response, determine at least one dimension characteristic of the object; and
  in response to the determination that the at least one dimension characteristic, compare the at least one dimension characteristic to at least one reference dimension characteristic of the object, and in response to a mismatch between the at least one dimension characteristic and the at least one reference dimension characteristic, determine that an improper object detection event has occurred;
  wherein the visual feature comprises one or more of a physical feature and/or a printed feature.

30. The electronic device of claim 29, wherein the device comprises a barcode reader.

* * * * *